Nov. 18, 1930.      E. B. JACOBSON      1,781,844
DEVICE FOR CONTROLLING THE VOLTAGE OF STORAGE BATTERIES
Filed July 12, 1927
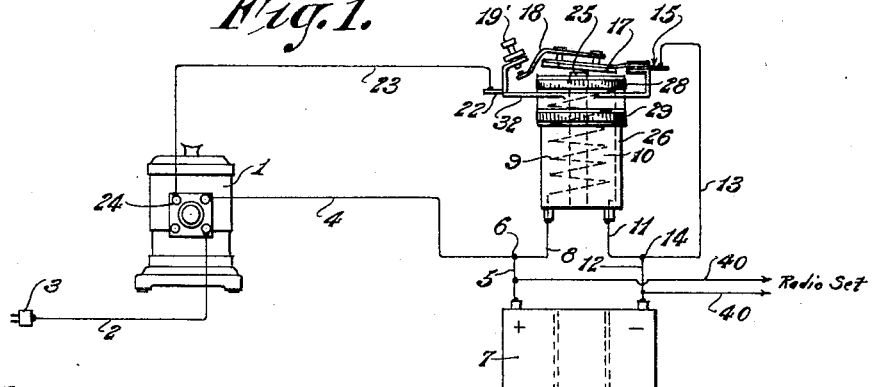
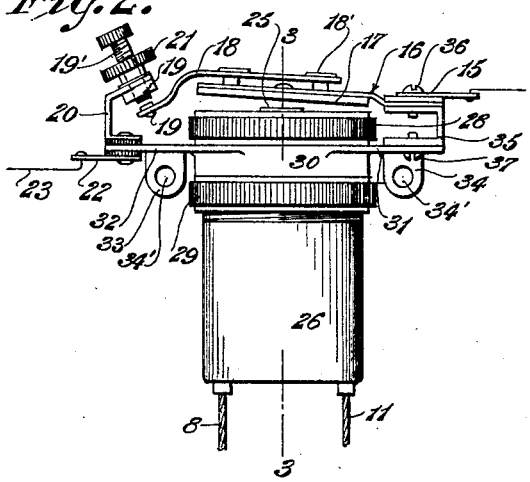
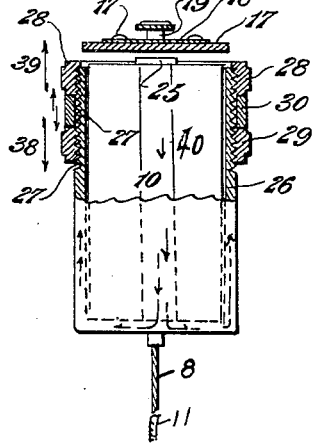
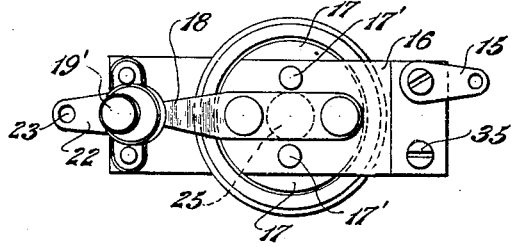
INVENTOR,
Edward B. Jacobson,
BY
Harry W. Bowen
ATTORNEY.

Patented Nov. 18, 1930

1,781,844

UNITED STATES PATENT OFFICE

EDWARD B. JACOBSON, OF PITTSFIELD, MASSACHUSETTS

DEVICE FOR CONTROLLING THE VOLTAGE OF STORAGE BATTERIES

Application filed July 12, 1927. Serial No. 205,131.

This invention relates to improvements in devices for controlling the voltage of a storage battery while being charged, or, during its discharge. An object of the invention is to provide a device which will automatically cut in, and, automatically cut out the source of electrical energy when the voltage of a storage battery drops below a definite point and cut it out when the voltage is restored by varying the reluctance of the air gap between an armature and the core of an electromagnet. It is a well known fact that a storage battery is more efficient when it is fully charged, or nearly so. Broadly, the invention comprises an electromagnet, the terminals of which are connected to the terminals of a storage battery. Connected in the circuit to one terminal of a rectifier is a make and break device, which device is connected to and operated by the armature of the electromagnet. Means is provided for varying the air gap between the armature and one of the poles of the electromagnet for the purpose of closely regulating the voltage of the battery required to energize the magnet which opens and closes the charging circuit. Means is further provided for slightly varying the tension of the spring which supports the armature of the electromagnet for the purpose of regulating the force necessary to operate the armature to open the battery charging circuit and to vary the spark gap. Further objects and nature of the invention will appear in the specification and claims.

Referring to the drawings:

Fig. 1 is a diagrammatic view showing a rectifier of alternating current which is connected to the terminals of the battery and to the terminals of the electromagnet which controls the voltage.

Fig. 2 is an elevational view of the device illustrating the means for varying the air gap between the armature and one of the poles of the electromagnet.

Fig. 3 is a vertical sectional view on the line 3—3 of Fig. 2, and

Fig. 4 is a top plan view of Fig. 2.

Referring to the drawings in detail:

1 designates a rectifier for alternating currents of a well known type, known as the "Tungar". This rectifier and battery charger is connected to a source of alternating current by means of the wire 2, having the plug 3. 4 is a wire extending from the rectifier and connected to the wire 5, as indicated at 6. Wire 5 is connected to one terminal of the storage battery 7. 8 is a wire extending from the connection 6 to one terminal of the coil 9 of the electromagnet 10. 11 is a wire extending from the other terminal of the coil 9 to the wire 12 that is connected to the other terminal of the battery 7. 13 is a wire extending from the connection 14 to the terminal connection 15. Attached to the connection 15 is a flat or leaf spring 16 to which is secured the armature 17 by means of the rivets 17'. Attached to the armature 17 is the spring 18 carrying one of the contact points 19 of the make and break contact which co-operates with the adjustable make and break screw terminal 19' which is threaded through the bracket 20. 21 is a lock nut for adjusting the position of the screw terminal 19' for varying the extent of opening of the contacts. Electrically connected to the bracket 20 is the terminal plate 22 to which the wire 23 is connected that leads back to the other terminal 24 of the battery charger and rectifier 1.

Referring now to the structure for varying the air gap between the pole 25 of the electromagnet 10 and the armature 17, 26 designates an iron or magnetic shell within which the electromagnet 10 is located. This shell is formed with an external thread 27 at its upper end. Engaging these threads are two internally threaded rings 28 and 29. 30 designates a collar that is slidably mounted on the shell and between the rings 28 and 29. It rests on the points of the threads 27. Integrally connected to the slidable ring or collar 30 are the two brackets 31 and 32 which are formed with two depending ears 33 and 34 having openings 34' for attaching the device to a fixed support. 35 designates a U-shaped piece that is connected to the bracket 31 and to the terminal 15 by means of the screws 36 and 37. It will be evident that by turning, or rotating the ring 29 downward on the threads 27 away from the collar 30, as indicated by the arrow 38, a space will be provided to permit the collar 30 to be moved downward on the casing 26 when the upper ring 28 is now rotated or threaded downward as the ring 28 will engage the collar 30 and carry the armature 17 closer or nearer to the pole 25. It will also be obvious that the reverse operation will move or carry the armature 17 further away from the pole 25, that is to say by turning the upper ring 28 upward as indicated by the arrow 39 and then rotating the lower ring 29 it will move the sleeve 30 upward. By means of this construction the space between the pole 25 of the magnet and the armature 17 may be very accurately adjusted and secured in place.

For the purpose of varying the opening of the contacts 19 the screw terminal 19' is threaded inward through the bracket 20. This will exert a pressure on the leaf terminal 18 and consequently vary the extent of opening of the contacts. The tension of the spring 16 which supports the armature will also be slightly varied. The operation of opening and closing the contacts 19 may be described as follows: Consider the voltage of the battery 7 as being below a full charge, the charging current will flow through the wires 4 and 5 to the storage battery and completing the circuit through wires 12 and 13, the terminal connection 15, armature 17, the spring terminal 18, contacts 19 and wire 23 to the other terminal 24 of the charger 1. Current will continue to flow until the voltage of the battery is brought up to normal, when current from the battery will then flow through coil 9 and produce sufficient force at attract the armature 18. This operation will open the contacts 19 and cut out the charging current. The contacts 19 remain open as long as the voltage at the terminals of the battery is practically normal. As for example, the normal or high voltage may be between the readings 7.2 and 7.4 and the low voltage between 5.6 and 5.8 which gives a difference in the variation of the voltage at the terminals of the battery of about 1.6 and this close regulation may be accomplished by means of the adjusting rings 28 and 29 which moves the collar 28 having the armature 17 attached thereto and varying slightly the tension of the spring 16.

It will therefore be seen that I have provided a device for automatically cutting in and out the charging current of a storage battery and maintain the voltage of the battery practically constant. By varying the air gap it will of course vary the current required to move the armature. By varying the position of the contacts 19 the extent of opening of the contact point 19 may be changed. The wires 40 lead to a radio set. The reference numeral 18' designates rivets for securing the spring 18 to the armature.

It should be stated that the lower end of the core 40 is magnetically connected to the inner bottom surface of the magnetic shell 26 in order to form a closed magnetic circuit through the core 40, the shell 26, armature 17 and pole 25, as shown by the arrows. This construction renders the device very efficient as practically the only air gap is between the armature 17 and the pole 25.

What I claim is:

1. A device for the purpose described, comprising an electromagnet, an armature operated by the electromagnet, a magnetic shell enclosing the magnet, the magnetic shell being formed with externally located threads, threaded rings located on the threads of the shell, a slidable collar located between the rings, said rings being for the purpose of adjusting the collar and armature on the shell, whereby the positions of the collar will vary the air gap between the armature and the pole of the electromagnet and whereby the threaded rings operate to firmly lock the collar in its adjustable positions.

2. An electromagnet comprising a magnetizable shell member for conducting lines of force, a core member located within the shell member and having one of its poles in engagement with the bottom part of the flux circuit through the shell and core, a winding about the core, the upper end of the shell being threaded to receive threaded rings, an unthreaded collar or ring between the threaded rings, an armature supported by the collar, the threaded rings serving to adjust the collar on the shell member and the air gap between the armature and the other pole of the core of the electromagnet and varying the reluctance of the flux circuit.

3. In an electromagnet, a shell member, a coil therein, a core axially within the coil, the shell having external threads, threaded rings engaging the said threads, a freely movable member on the shell and adjustably secured by the rings, and an armature carried by the freely movable member, whereby the air gap between the armature and core may be varied, the construction permitting the magnetic flux to flow through the shell.

EDWARD B. JACOBSON.